(12) United States Patent
Shimatani et al.

(10) Patent No.: US 7,041,376 B2
(45) Date of Patent: May 9, 2006

(54) WINDOW MEMBER FOR A COMBUSTION APPARATUS, EXCELLENT IN APPEARANCE EVEN AFTER LONG-TIME USE

(75) Inventors: Narutoshi Shimatani, Uji (JP); Toshimasa Kanai, Kanzaki-gun (JP)

(73) Assignee: Nippon Electric Glass Co., Ltd., Otsu (JP)

( * ) Notice: Subject to any disclaimer, the term of this patent is extended or adjusted under 35 U.S.C. 154(b) by 143 days.

(21) Appl. No.: 10/426,288

(22) Filed: Apr. 30, 2003

(65) Prior Publication Data

US 2003/0203215 A1 Oct. 30, 2003

(30) Foreign Application Priority Data

Apr. 30, 2002 (JP) .............................. 2002-128629

(51) Int. Cl.
*B32B 9/00* (2006.01)
(52) U.S. Cl. ...................... 428/432; 428/697; 428/698; 428/704
(58) Field of Classification Search ................ 428/428, 428/432, 433, 434, 446, 448, 697, 698, 701, 428/702, 704
See application file for complete search history.

(56) References Cited

U.S. PATENT DOCUMENTS

| | | | |
|---|---|---|---|
| 4,048,978 A | | 9/1977 | Plumat et al. |
| 6,159,607 A | * | 12/2000 | Hartig et al. ................ 428/426 |
| 6,231,999 B1 | | 5/2001 | Krisko |
| 6,475,626 B1 | * | 11/2002 | Stachowiak .................. 428/428 |
| 2003/0157339 A1 | * | 8/2003 | Sawada et al. .............. 428/432 |

FOREIGN PATENT DOCUMENTS

| | | |
|---|---|---|
| DE | 199 39 787 | 2/2001 |
| JP | 54-069335 | 6/1979 |
| JP | 07-086522 | 3/1995 |
| JP | 10-146515 | 5/1998 |

* cited by examiner

Primary Examiner—Deborah Jones
Assistant Examiner—G. Blackwell
(74) Attorney, Agent, or Firm—Collard & Roe, P.C.

(57) ABSTRACT

In a window member (10) to be used as a window of a combustion apparatus, adjusting means is bonded to a substrate (11) made of glass. The adjusting means adjusts an average transmittance of the window member so that the average transmittance at a thickness of 4 mm for an electromagnetic wave having a wavelength of 0.4–0.8 μm falls within a range between 10 and 50%. The adjusting means may comprise a film member (12) bonded to a principal surface (11a) of the substrate.

12 Claims, 2 Drawing Sheets

WINDOW MEMBER FOR A COMBUSTION APPARATUS, EXCELLENT IN APPEARANCE EVEN AFTER LONG-TIME USE

BACKGROUND OF THE INVENTION

This invention claims priority to Japanese patent application JP 2002-128629, the disclosure of which is incorporated herein by reference.

This invention relates to a window member used in a viewing window of a combustion apparatus using wood, gas, coal, kerosene, or the like as a fuel.

As a combustion apparatus of the type, a heater, a cooker, a boiler, and the like are known. For example, a fireplace-type stove as the heater is generally classified into a direct heating system and an indirect heating system. The stove of the direct heating system is opened at its front portion and directly heats an area around the stove by heat radiation from a combustion flame.

On the other hand, the stove of the indirect heating system heats air by an internal heat source into warm air and supplies the warm air into a room by the use of a fan or blower so that a whole of the room is heated by circulation of the warm air. The stove of the indirect heating system has a viewing window on its front side. Through the viewing window, the combustion flame can be monitored and confirmed. Therefore, it is possible to keep safety against occurrence of fire and production of a toxic gas resulting from incomplete combustion. In addition, sensuous heating effect or warm feeling is given because the combustion flame is seen through the viewing window.

A window member used in the viewing window is required to have heat resistance against 300° C. or more. Generally, the window member of the type is made of a low expansion glass such as a fused silica, or a low-expansion borosilicate glass, or a crystallized glass with β-quartz solid solution precipitated as main crystals.

However, if the combustion apparatus using wood, gas, coal, kerosene or the like as a fuel is used for a long time, ash dust is adhered to the window member so that the window member becomes remarkably dirty. Thus, the appearance of the combustion apparatus is spoiled.

SUMMARY OF THE INVENTION

It is therefore an object of the present invention to provide a window member for a combustion apparatus, which is excellent in appearance even if it is used for a long time.

Other objects of the present invention will become clear as the description proceeds.

According to an aspect of the present invention, there is provided a window member to be used as a window of a combustion apparatus and having an average transmittance of 10–50% at a member thickness of 4 mm for an electromagnetic wave having a wavelength of 0.4–0.8 μm.

According to another aspect of the present invention, there is provided a window member to be used as a window of a combustion apparatus, the window member including a glass substrate and adjusting means bonded to the substrate, the window member having an average transmittance adjusted by the adjusting means so that the average transmittance at a thickness of 4 mm falls within a range between 10 and 50% for an electromagnetic wave having a wavelength of 0.4–0.8 μm.

DESCRIPTION OF THE PREFERRED EMBODIMENTS

Figure 1:
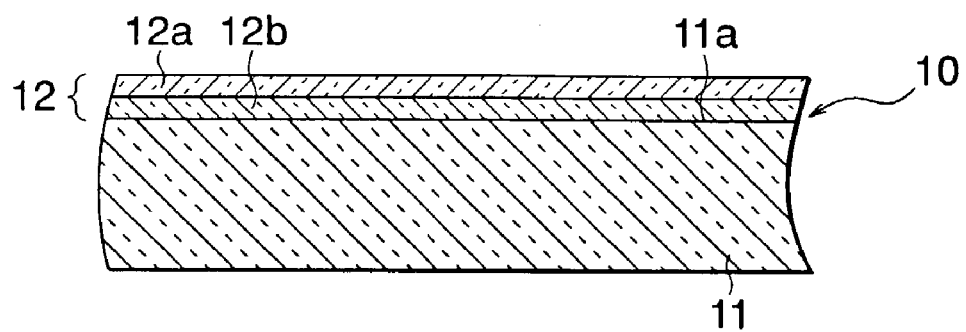
FIG. 1 is a sectional view for describing a window member according to a first embodiment of the present invention.

Referring to FIG. 1, description will be made of a window member according to a first embodiment of the present invention.

The window member depicted by 10 in FIG. 1 is for use in a viewing window of a combustion apparatus such as a fireplace-type stove of an indirect heating system. The window member 10 comprises a substrate 11 made of a glass and a film member 12 bonded to a principal surface 11a of the substrate 11. The film member 12 serves to adjust an average transmittance of the window member 10 so that the average transmittance at a member thickness of 4 mm falls within a range between 10 and 50% for an electromagnetic wave having a wavelength of 0.4–0.8 μm. Namely, the average transmittance of the window member 10 falls, in case where the window member 12 has a thickness of 4 mm, within a range between 10 and 50% for the electromagnetic wave having the wavelength of 0.4–0.8 μm. Thus, the film member 12 serves as adjusting means.

If the average transmittance of the window member 10 is smaller than 10%, a combustion flame inside the combustion apparatus is hardly seen through the viewing window. In this event, occurrence of combustion can not be monitored and confirmed. In addition, sensuous heating effect or warm feeling can not be given. On the other hand, if the average transmittance of the window member 10 is higher than 50%, adhesion of ash dust is noticeable and distinct to spoil the appearance of the viewing window.

In the window member 10, the minimum transmittance for an electromagnetic wave having a wavelength of 0.6–0.8 μm is preferably greater than the maximum transmittance for an electromagnetic wave having a wavelength of 0.4–0.6 μm. Under the condition, the combustion flame is easily seen. Even if the ash dust is adhered to a surface of the window member 10, the ash dust is not noticeable and distinct so that excellent appearance can be maintained for a long time.

Preferably, the window member 10 has an average reflectance adjusted by the film member 12 so that the average reflectance inside the combustion apparatus is not smaller than 25% for an electromagnetic wave having a wavelength of 1.0–2.5 μm. Under the condition, one can look into the combustion apparatus through the viewing window without feeling hot and a combustible material near the combustion apparatus is prevented from being burned. In case where the window member 10 is used as a window of a heater of an indirect heating system, heat ray hardly escapes through the viewing window. As a consequence, an internal temperature inside the heater of the indirect heating system is elevated and heating effect is improved.

In the window member 10 illustrated in FIG. 1, the film member 12 includes a first layer 12a comprising an oxidation prevention film located at an outer surface of the window member 10, and a second layer 12b comprising a color film interposed between the substrate 11 and the first layer 12a. In other words, on the principal surface 11a of the substrate 11, the second layer 12b comprising the color film 12b and the first layer 12a comprising the oxidation prevention film are formed in this order. The second layer 12b has a geometric thickness of 10–1000 nm, preferably 20–300 nm. The first layer 12a has a geometric thickness of 30–1000 nm, preferably 50–300 nm.

Since the film member 12 has the color film, it is possible to easily adjust the average transmittance of the window member so that the average transmittance at a thickness of 4 mm falls within a range between 10 and 50% for the electromagnetic wave having a wavelength of 0.4–0.8 µm. Upon application of the window member to the combustion apparatus, the color film is faced to the interior of a room. In this case, it is possible to easily adjust the average reflectance inside the combustion apparatus so that the average reflectance is not smaller than 30% for the electromagnetic wave having a wavelength of 1.0–2.5 µm. Therefore, the color film is prevented from thermal deterioration. As will later be described, the color film includes at least one kind of a metal, an alloy, and metal nitride.

Figure 2:
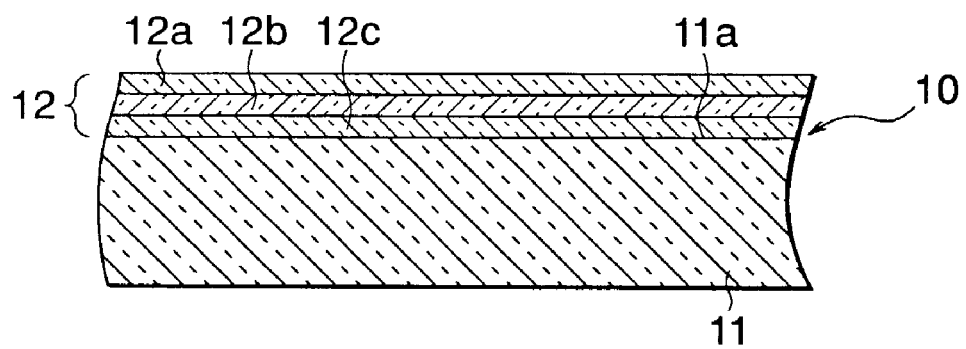
FIG. 2 is a sectional view for describing a window member according to a second embodiment of the present invention.

Referring to FIG. 2, description will be made of a window member according to a second embodiment of the present invention. Similar parts are designated by like reference numerals and will not be described any further.

In the window member 10 illustrated in FIG. 2, the film member 12 further includes a third layer 12c comprising an oxidation prevention film and interposed between the substrate 11 and the second layer 12b. The third layer 12c has a geometric thickness of 50–1000 nm, preferably 50–300 nm. The second layer 12b comprises a color film having a geometric thickness of 10–1000 nm, preferably 20–300 nm. The first layer 12a comprises an oxidation prevention film having a geometric thickness of 50–1000 nm, preferably 50–300 nm.

In the window member 10 illustrated in FIG. 2, the oxidation prevention film is formed on the color film and another oxidation prevention film is formed between the substrate 11 and the color film. Therefore, heat resistance is improved. Even if the surface of the window member 10 facing the interior of the room reaches a highest burning temperature of 400° C., the color film is hardly oxidized and suppressed in deterioration.

Figure 3:
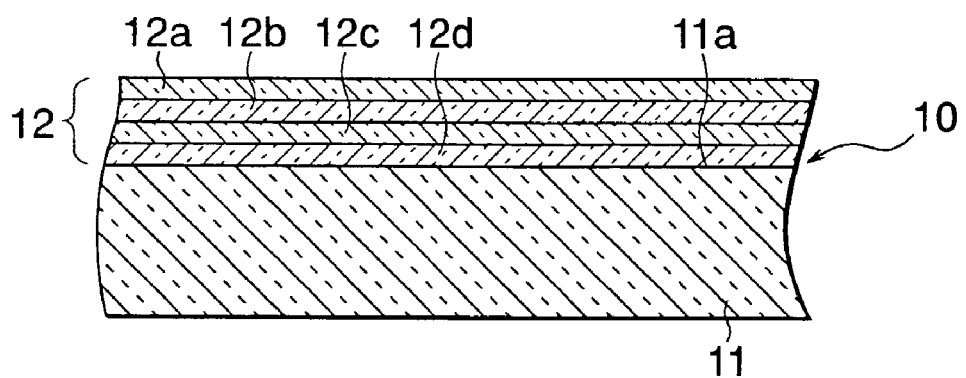
FIG. 3 is a sectional view for describing a window member according to a third embodiment of the present invention.

Referring to FIG. 3, description will be made of a window member according to a third embodiment of the present invention. Similar parts are designated by like reference numerals and will not be described any further.

In the window member 10 illustrated in FIG. 3, the film member 12 further includes a fourth layer 12d comprising a color film and interposed between the substrate 11 and the third layer 12c. The fourth layer 12d has a geometric thickness of 10–1000 nm, preferably 20–300 nm. The third layer 12c comprises an oxidation prevention film having a geometric thickness of 10–1000 nm, preferably 20–300 nm. The second layer 12b comprises a color film having a geometric thickness of 10–1000 nm, preferably 20–300 nm. The first layer 12a comprises an oxidation prevention film having a geometric thickness of 50–1000 nm, preferably 50–300 nm.

Figure 4:
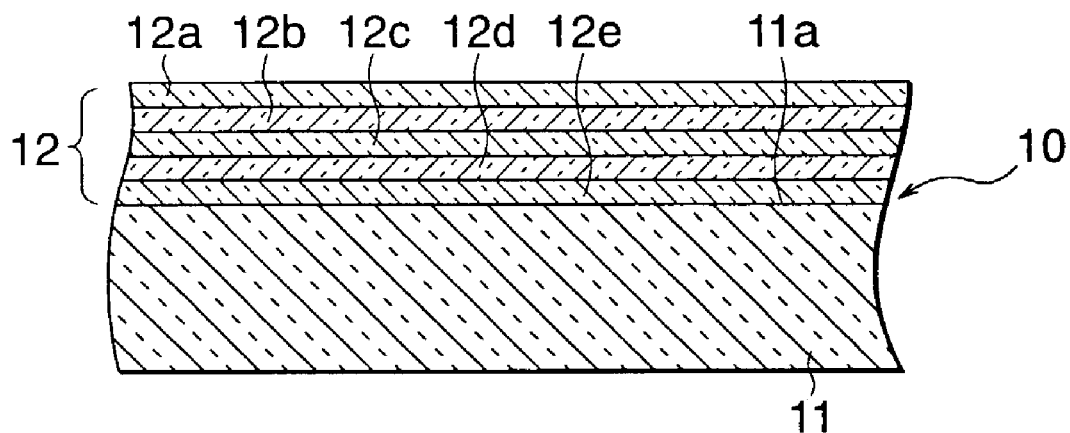
FIG. 4 is a sectional view for describing a window member according to a fourth embodiment of the present invention.

Referring to FIG. 4, description will be made of a window member according to a fourth embodiment of the present invention. Similar parts are designated by like reference numerals and will not be described any further.

In the window member 10 illustrated in FIG. 4, the film member 12 further has a fifth layer 12e comprising an oxidation prevention film and interposed between the substrate 11 and the fourth layer 12d. The fifth layer 12e has a geometric thickness of 50–1000 nm, preferably 50–300 nm. The fourth layer 12d comprises a color film having a geometric thickness of 10–1000 nm, preferably 20–300 nm. The third layer 12c comprises an oxidation prevention film having a geometric thickness of 5–1000 nm, preferably 10–300 nm. The second layer 12b comprises a color film having a geometric thickness of 10–1000 nm, preferably 20–300 nm. The first layer 12a comprises an oxidation prevention film having a geometric thickness of 50–1000 nm, preferably 50–300 nm.

Figure 5:
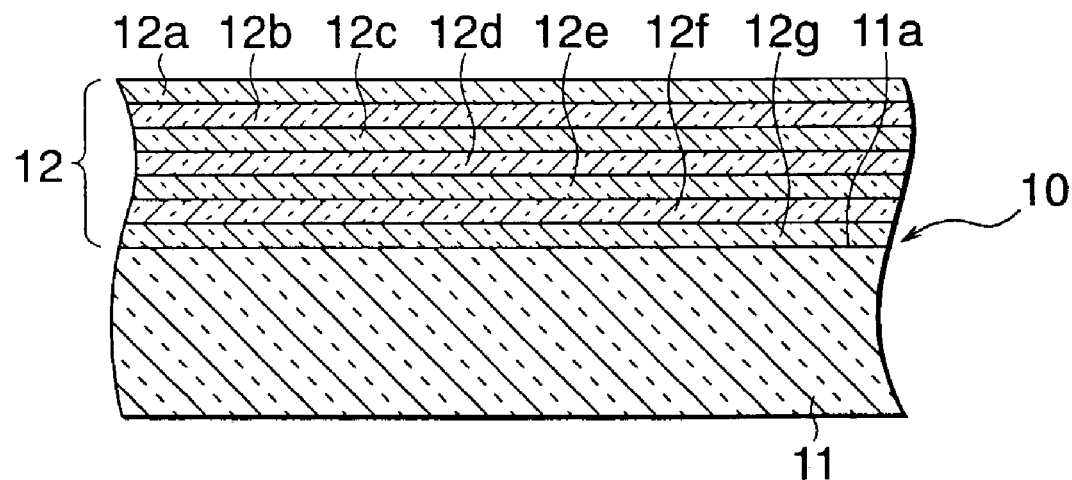
FIG. 5 is a sectional view for describing a window member according to a fifth embodiment of the present invention.

Referring to FIG. 5, description will be made of a window member according to a fifth embodiment of the present invention. Similar parts are designated by like reference numerals and will not be described any further.

In the window member 10 illustrated in FIG. 5, the film member 12 further includes a sixth layer 12f comprising a color film interposed between the substrate 11 and the fifth layer 12e, and a seventh layer 12b comprising an oxidation prevention film interposed between the sixth layer 12f and the substrate 11. The seventh layer 12g has a geometric thickness of 10–1000 nm, preferably 20–300 nm. The sixth layer 12f has a geometric thickness of 10–1000 nm, preferably 20–300 nm. The fifth layer 12e comprises an oxidation prevention film having a geometric thickness of 5–1000 nm, preferably 10–300 nm. The fourth layer 12d comprises a color film having a geometric thickness of 10–1000 nm, preferably 20–300 nm. The third layer 12c comprises an oxidation prevention film having a geometric thickness of 5–1000 nm, preferably 10–300 nm. The second layer 12b comprises a color film having a geometric thickness of 10–1000 nm, preferably 20–300 nm. The first layer 12a comprises an oxidation prevention film having a geometric thickness of 50–1000 nm, preferably 50–300 nm.

In each of the window members 10 in FIGS. 3 to 5, a plurality of the color films are formed via the oxidation prevention films interposed therebetween. Therefore, it is possible to finely control a color tone, a visible light transmittance, or an infrared reflectance. In addition, heat resistance is further improved.

As the glass forming the substrate 11 in each of the window members 10 in FIGS. 1 to 5, use is advantageously made of a low-expansion glass which is resistant against rapid cooling from 600° C., i.e., which is excellent in thermal shock resistance. Specifically, it is desired to use a glass having a coefficient of thermal expansion not greater than $50 \times 10^{-7}/°$ C. In order to form the substrate 11, it is possible to use a low-expansion borosilicate glass, a fused silica, or a low-expansion crystallized glass with β-quartz solid solution precipitated therein. In particular, it is preferable to use a glass having an average coefficient of thermal expansion of $-10 \times 10^{-7}/°$ C. to $+30 \times 10^{-7}/°$ C., more preferably $-10 \times 10^{-7}/°$ C. to $+20 \times 10^{-7}/°$ C. This glass is further improved in thermal shock resistance. Even if temperature distribution within a low-expansion glass plate becomes large during burning, occurrence of stress is suppressed so that the glass is hardly broken. The low-expansion glass may be colored.

The color film contains one kind of metal selected from Si, Ti, Al, Nb, W, Mo, Pt, and Au, one kind of alloy selected from Hastelloy, Inconel, and Nichrome, or at least one kind of metal nitride selected from nitrides of Ti, Nb, W, and Mo. With this structure, adhesion of dust due to static electricity is suppressed so that the frequency of cleaning operations can be reduced. As a particular case, aluminum may be introduced into the metal, the alloy, or the metal nitride mentioned above. In the particular case, aluminum oxide is formed at an interface of the color film to serve as a barrier. Therefore, heat resistance is improved.

Preferably, the color film is made of a metal such as Si. In this case, the minimum transmittance of the window member 10 for the electromagnetic wave having a wavelength of 0.6–0.8 µm is greater than the maximum transmittance for the electromagnetic wave having a wavelength of 0.4–0.6 µm.

Preferably, the oxidation prevention film contains nitride of at least one kind of metal selected from Si, Ti, Al, Nb, W, and Mo or oxide of Si or Al. With this structure, oxidation prevention effect of the color film is improved.

Each of the color films and the oxidation prevention films can be formed by chemical vapor deposition, physical vapor deposition, ion plating, or sputtering. In case where each of the color films and the oxidation prevention films is formed by sputtering, the film has a dense and compact structure and is firmly formed on the surface of the substrate 11. Furthermore, at least one of the color film and the oxidation prevention film may be made of metal nitride. In the above-mentioned manner, chemical durability and physical durability are improved. Even if chemical or physical washing/cleaning operations are repeated by the use of a detergent and a brush, the films are hardly peeled off.

The color film or the oxidation prevention film may be formed by a material which is not colored when it is oxidized into oxide. Specifically, each of these films may be made of a metal such as Ti, Si, or Al or nitride thereof. In this case, coloration or change in characteristic of the glass hardly occurs when the glass is re-melted for use as a raw material.

The color film may contain TiN, Si, AlTiN, W, or WN. In this event, heat resistance is improved. The oxidation prevention film may contain SiN, AlN, $SiO_2$ or $Al_2O_3$. In this event, oxidation prevention effect of the color film is improved.

By selecting the film material and the film thickness of each of the color film and the oxidation prevention film, it is possible to achieve a variety of color tones utilizing interference of light.

Now, specific examples of the window member will be described together with one comparative example.

TABLE 1

| | | Example | | | | | | |
|---|---|---|---|---|---|---|---|---|
| | | 1 | 2 | 3 | 4 | 5 | 6 | 7 |
| Film Structure | 1st layer thickness (nm) | SiN (200) | SiN (150) | SiN (150) | SiN (100) | SiN (50) | SiN (150) | SiN (150) |
| | 2nd layer thickness (nm) | TiN (80) | TiN (80) | TiN (60) | TiN (70) | TiN (70) | TiN (70) | Si (20) |
| Color Tone | | Blue | Gold | Red | Gray | Purple | Orange | Orange |
| Average Transmittance (%) at 0.4–0.8 µm | | 15 | 20 | 15 | 20 | 20 | 15 | 35 |

TABLE 1-continued

| | Example | | | | | | |
|---|---|---|---|---|---|---|---|
| | 1 | 2 | 3 | 4 | 5 | 6 | 7 |
| Average Reflectance (%) at 1.0–2.5 µm | 30 | 30 | 35 | 50 | 65 | 35 | 60 |

TABLE 2

| | | Example | | | |
|---|---|---|---|---|---|
| | | 8 | 9 | 10 | 11 |
| Film Structure | 1st layer thickness (nm) | SiN (100) | SiN (100) | SiN (150) | SiN (150) |
| | 2nd layer thickness (nm) | Si (20) | AlTiN (100) | W (20) | WN (50) |
| | 3rd layer thickness (nm) | SiN (100) | SiN (150) | SiN (150) | SiN (150) |
| Color Tone | | Red | Brown | Brown | Yellow |
| Average Transmittance % at 0.4–0.8 µm | | 30 | 20 | 35 | 30 |
| Average Reflectance % at 1.0–2.5 µm | | 70 | 40 | 30 | 30 |

TABLE 3

| | | Example | | |
|---|---|---|---|---|
| | | 12 | 13 | 14 |
| Film Structure | 1st layer thickness (nm) | SiN (100) | SiN (100) | SiN (100) |
| | 2nd layer thickness (nm) | TiN (30) | TiN (30) | AlTiN (20) |
| | 3rd layer thickness (nm) | SiN (20) | SiN (10) | SiN (10) |
| | 4th layer thickness (nm) | TiN (30) | TiN (30) | TiN (50) |
| | 5th layer thickness (nm) | — | SiN (100) | SiN (10) |
| | 6th layer thickness (nm) | — | — | AlTiN (20) |
| | 7th layer thickness (nm) | — | — | SiN (20) |
| Color Tone | | Gray | Gray | Brown |
| Average Transmittance % at 0.4–0.8 µm | | 20 | 20 | 20 |
| Average Reflectance % at 1.0–2.5 µm | | 40 | 50 | 40 |

TABLE 4

| | Comparative Example |
|---|---|
| Film Structure | No film |
| Color Tone | Colorless |
| Average Transmittance (%) at 0.4–0.8 µm | 90 |
| Average Reflectance (%) at 1.0–2.5 µm | 9 |

In Tables 1–5, the film member in each of Examples 1–7 comprises two layers. Therefore, these Examples are included in the window member of FIG. 1. In each of Examples 8–11, the film member comprises three layers. Therefore, these examples are included in the window member of FIG. 2. In Example 12, the film member comprises four layers. Therefore, Example 12 is included in the window member of FIG. 3. In Example 13, the film member comprises five layers. Therefore, Example 13 is included in the window member of FIG. 4. In Example 14, the film member comprises seven layers. Therefore, Example 14 is included in the window member of FIG. 5. In Comparative Example, no film member is formed.

In order to produce each of Examples 1–14, preparation was made of a substrate having a thickness of 4 mm and made of a transparent crystallized glass (N-0 manufactured by Nippon Electric Glass Co., Ltd.) having an average coefficient of linear thermal expansion of $-5\times10^{-7}/°$ C. at 30–500° C. On the substrate, the color films and the oxidation prevention films were formed by sputtering to obtain a film structure shown in Tables 1–5. Thus, the window member is produced. In Comparative Example, neither the color film nor the oxidation prevention film was formed.

Next, the above-mentioned window member was fitted to a gas stove as a viewing window so that its surface provided with the film member was faced to the interior of the room. Thereafter, the gas stove was ignited and kept burnt for 100 hours. Then, evaluation was made of the appearance of the viewing window, the temperature of the interior of a combustion chamber, heat radiation through the viewing window, and the amount of dust adhered to the viewing window.

Furthermore, the average transmittance at the wavelength of 0.4–0.8 μm and the average reflectance at the wavelength of 1.0–2.5 μm were measured by the use of a spectrophotometer. The average reflectance was measured on the side where the film member was not formed.

The heat radiation through the viewing window was evaluated by measuring the temperature at a point spaced by 0.5 m from the viewing window. The amount of dust adhered to the viewing window was evaluated by visual observation.

In each of Examples 1 through 14, the dust was adhered but was not noticeable and distinct while the combustion flame inside the combustion chamber could be confirmed. In particular, in Examples 7 and 8, the minimum transmittance at the wavelength of 0.6–0.8 μm is greater than the maximum transmittance at the wavelength of 0.4–0.6 μm. The dust was not noticeable at all and the combustion flame could be clearly confirmed. An internal temperature inside the combustion chamber was as high as 550° C. while the temperature at the point spaced by 0.5 m from the viewing window was as low as 60° C. or less. The amount of dust adhered onto the surface faced to the interior of the room was as small as about 1/10 of that of Comparative Example.

On the other hand, in Comparative Example, the dust adhered to the viewing window was distinct and noticeable and the appearance was inferior. The internal temperature inside the combustion chamber was as low as 500° C. while the temperature at the point spaced by 0.5 m from the viewing window was as high as 100° C.

While the present invention has thus far been described in connection with a few embodiments thereof, it will readily be possible for those skilled in the art to put this invention into practice in various other manners. For example, the window member is not only used as the viewing window of the combustion apparatus, such as a heater, a cooker, and a boiler, using wood, gas, coal, kerosene as a fuel but also suitable as a cylindrical part of a stove having a cylindrical heating unit, a globe for a candle or a gas lamp, and a window of a burning or calcining or sintering furnace or a high-temperature heater. The window member may be a flat plate or, alternatively, may have a curved section or a U-shaped section.

What is claimed is:

1. A window member for use in a window of a combustion apparatus, including a glass substrate and adjusting means comprising a film member bonded to a principal surface of the substrate, the film member including a color film containing at least one metal nitride selected from nitrides of Ti, Nb, W, and Mo, the window member having an average transmittance adjusted by the adjusting means so that the average transmittance at a member thickness of 4 mm falls within a range between 10 and 50% for an electromagnetic wave having a wavelength of 0.4–0.8 μm, the glass having a coefficient of thermal expansion not greater than $50\times10^{-7}/°$ C.

2. A window member as claimed in claim 1, wherein the minimum transmittance for an electromagnetic wave having a wavelength of 0.6–0.8 μm is adjusted by the adjusting means to be greater than the maximum transmittance for an electromagnetic wave having a wavelength of 0.4–0.6 μm.

3. A window member as claimed in claim 1, wherein the average reflectance for an electromagnetic wave having a wavelength of 1.0–2.5 μm is adjusted by the adjusting means to be not smaller than 25%.

4. A window member as claimed in claim 1, wherein the color film contains at least one metal selected from Si, Ti, Al, Nb, W, Mo, Pt, and Au.

5. A window member as claimed in claim 1, wherein the color film contains at least one alloy selected from Hastelloy, Inconel, and Nichrome.

6. A window member as claimed in claim 1, wherein the film member further includes an oxidation prevention film.

7. A window member as claimed in claim 6, wherein the color film is formed between the substrate and the oxidation prevention film.

8. A window member as claimed in claim 6, wherein the oxidation prevention film is formed between the substrate and the color film.

9. A window member as claimed in claim 6, wherein the oxidation prevention film contains at least one metal nitride selected from nitrides of Si, Ti, Al, Nb, W, and Mo.

10. A window member as claimed in claim 6, wherein the oxidation prevention film contains oxide of Si.

11. A window member as claimed in claim 6, wherein the oxidation prevention film contains oxide of Al.

12. A window member for use in a window or a combustion apparatus, including a substrate of glass and a film member coupled to the substrate, the window member having an average transmittance adjusted by the film member so that the average transmittance at a member thickness of 4 mm falls within a range between 10 and 50% for an electromagnetic wave having a wavelength of 0.4–0.8 μm, the film member including a color film containing at least one metal nitride selected from nitrides of Ti, Nb, W, and Mo.

* * * * *